United States Patent [19]

Laurer et al.

[11] 4,414,468

[45] Nov. 8, 1983

[54] SYSTEMATIC ERROR CORRECTION IN BAR CODE SCANNER

[75] Inventors: George J. Laurer, Wendell; Olen L. Stokes, Jr., Cary, both of N.C.

[73] Assignee: International Business Machines Corporation, Armonk, N.Y.

[21] Appl. No.: 264,879

[22] Filed: May 18, 1981

[51] Int. Cl.³ .............................................. G06K 7/10
[52] U.S. Cl. ..................................... 235/462; 235/463
[58] Field of Search ................................ 235/462, 463

[56] References Cited

U.S. PATENT DOCUMENTS 4,272,675  6/1981  Neseem ................................ 235/463
4,354,101 10/1982  Hester .................................. 235/463

FOREIGN PATENT DOCUMENTS 54-140424 10/1979 Japan ..................................... 235/463

Primary Examiner—Harold I. Pitts
Attorney, Agent, or Firm—Gerald R. Woods

[57] ABSTRACT

A technique for compensating for systematic errors in printing or reading bar codes is disclosed. Label decoding always begins with a center character and proceeds one character at a time toward a margin. When bar-space pair measurements indicate an ambiguous character (which can only be fully decoded using bar width measurements) error correction is based on the characteristics of the adjacent, previously decoded character.

7 Claims, 10 Drawing Figures

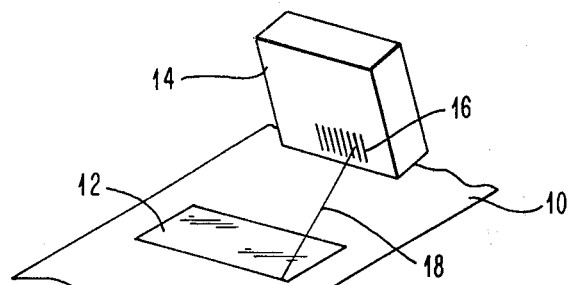
FIG. 1
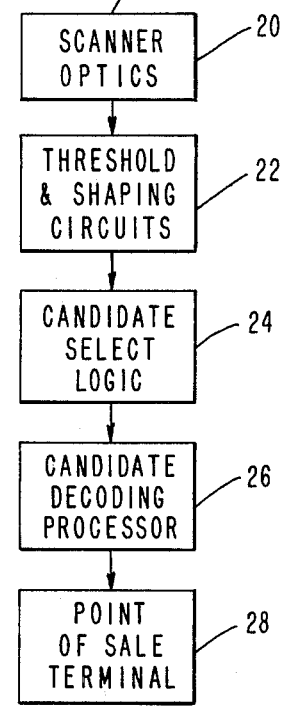
FIG. 9
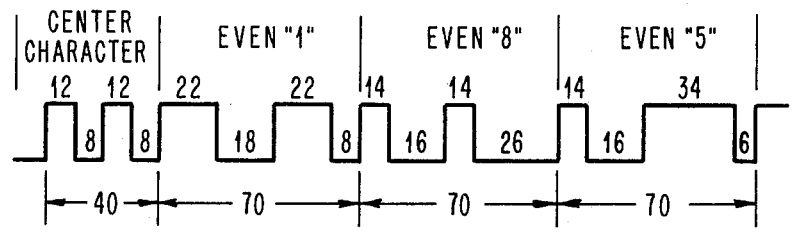

ODD "4"

EVEN "4"

SYSTEMATIC ERROR CORRECTION IN BAR CODE SCANNER

TECHNICAL FIELD

This invention relates to bar code scanners and more particularly to a technique for correcting systematic errors in apparent bar widths.

One of the more significant changes in the supermarket industry in recent years has been the general acceptance of product-identifying labels encoded using a standard bar code format. Such labels can be automatically read at a checkout stand by an optical scanning component of a point-of-sale system. Decoded label information can be used for a number of purposes, including look up of item prices stored in the memory, performance of inventory control operations, tracking or monitoring of sales of particular items and preparation of descriptive customer receipt tapes.

Various versions of the code are in use in different countries around the world. In a given country, a UPC (Universal Product Code) format, an EAN (European Article Number) format or a JAN (Japanese Article Number) format may be in use. While the formats may differ from each other in detail, all use the same basic encoding system wherein a data character is represented by a combination of two bars alternating with two spaces.

The majority (0, 3, 4, 5, 6 and 9) of decimal characters can be decoded using certain bar-space pair measurements taken within the character. There are, however, certain decimal characters (1, 2, 7 and 8) which cannot be uniquely identified by the bar-space pair measurements alone. The bar-space pair measurements are sufficient to identify each of the two subsets (1, 7 and 2, 8) into which these characters are grouped. The final identification of a character within one of the subsets requires an additional bar width measurement. If the combined widths of the bars within a character has a magnitude falling within a first range, one of the two subset characters is indicated. If the combined width falls within the second range, the other of the two characters is indicated.

The bar code representations of the decimal values 1, 2, 7, 8 are often referred to as ambiguous characters since they cannot be fully decoded with bar-space pair measurements alone. The bar code representations of the remaining decimal values, which can be decoded with bar-space pair measurements, are sometimes referred to as non-ambiguous characters.

If the UPC labels actually printed and in use always conformed strictly to all stated standards regarding bar widths, reflectance, etc., and if the scanners which read those labels always operated optimally, distinguishing between subset characters on the basis of bar width measurements would probably not be difficult. However, a number of systematic errors can occur which make it more difficult to distinguish between characters on the basis of bar width measurements. A systematic error is considered to be an error which occurs across the width of the label, being either uniform or changing in accordance with some continuous function.

The most common type of systematic error is that of ink spread or ink shrinking resulting from ink flow during the printing process. Where ink spread occurs, the bars are wider than intended. Where ink shrink occurs, the bars are narrower than intended. Systematic errors can also be caused by a number of other factors. These include changes in scanner velocity due to acceleration, drift in analog clipping level, changes in label contrast due to uneven printing plate pressure and differences in detector sensitivity in relation to label position.

While the causes vary, the result is the same; namely, that the detected or apparent bar width differs from the intended bar width. These unplanned changes in bar width can lead to difficulties in distinguishing between subset characters.

BACKGROUND ART

The need to correct for systematic errors is recognized. Currently, the following technique is used. During the decoding process, the label is scanned for a known character, such as a center character. A systematic error correction value is calculated by comparing the measured width of the center character bars with a reference width for those bars. The error correction value is then applied uniformly across the label.

This technique assumes that the error itself is uniform across the width of the label. That assumption may not always be correct. For example, it is possible for an ink shrink condition at one end of a label to change to an ink spread condition at the opposite end of the label. A correction based on the characteristics of the center character would not be helpful in reading such a label.

DISCLOSURE OF INVENTION

The present invention is an improved method of correcting for systematic errors in apparent bar widths. The method includes the following steps. The label characters are decoded in succession until a character is encountered which requires a bar width measurement in order to be fully decoded. The apparent bar width of that character is corrected as a function of the measured width of the character and the total measured and total standard bar widths of the adjacent, previously decoded character. The corrected bar width is used to fully decode the character. The foregoing steps are repeated until all characters in the label have been fully decoded.

It should be noted that any fully decoded character, even one of the ambiguous characters, can be used to fully decode the next character in a sequence in accordance with the described technique.

The advantage of this approach is that the amount of correction that is made actually reflects changes or trends in the systematic error across the width of the label. For example, if an ink spread error condition becomes progressively greater in the direction of decoding, the amount of correction will also become progressively greater. The decodability of the bar code representations of the 1, 2, 7 and 8 decimal characters is enhanced.

BRIEF DESCRIPTION OF THE DRAWINGS

While the specification concludes with claims particularly pointing out and distinctly claiming that which is regarded as the present invention, the details of a preferred implementation of the invention may be more readily ascertained from the following description when read in conjunction with the accompanying drawings wherein:

FIG. 1 is a generalized block diagram of a bar code scanning system within which the present invention may be used;

FIG. 9 shows square wave pulses of the type that might be generated during the reading of a partial UPC label.

BEST MODE FOR CARRYING OUT THE INVENTION

Figure 2:
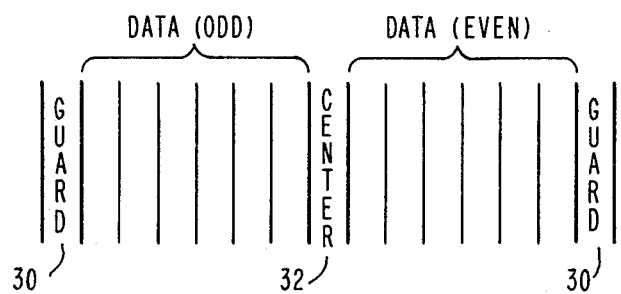
FIG. 2 shows the general format of one commonly-used type of label employing bar code characters.

Referring to FIG. 1, a checkout stand is represented generally by a surface 10 having a transparent scanner window 12. As a grocery item 14 is moved over window 12, a bar coded label 16 on the product surface is swept one or more times by a light beam 18 whch originates below the checkout stand surface in an optical subsystem 20. Light reflected from the label 16 impinges on a photosensitive element in the optical subsystem 20. Reflected light, the level of which varies as a function of the reflectance of the particular point on the package being scanned, is converted into a roughly sinusoidal electrical signal which is applied to threshold and shaping circuits 22. A function of the circuits 22 is to convert the roughly sinusoidal signal to a square wave pulse train in which the duration of each pulse bears a temporal relation to a particular light or dark area being traversed by the beam 18.

In almost all instances, a bar-coded label is surrounded by printed matter, graphics, pictorial material, etc., which may produce code-like reflections. Candidate select logic circuits 24 serve to "find" the actual label signals among the extraneous and meaningless signals produced upon scanning of printed matter, etc. When one or more label candidates has been found, those candidates are transferred to a candidate decoding processor 26, the function of which is to generate a numeric representation of the label structure. This numeric structure or decoded label is then passed on to a point-of-sale terminal 28 or possibly a store controller to permit price lookup operations, inventory control operations, and perhaps other functions, to be performed.

Referring to FIG. 2, a widely used type of UPC label includes guard characters 30 at the left and right margins of the label. The data characters in the label are divided by a center character 32 into a left (odd) set of data characters and a right (even) set of data characters. The difference between the data characters to the left of the center character 32 and the data characters to the right of the center character 32 and the meanings of the terms "odd" and "even" are explained with reference to FIGS. 3 and 4.

Figure 3:
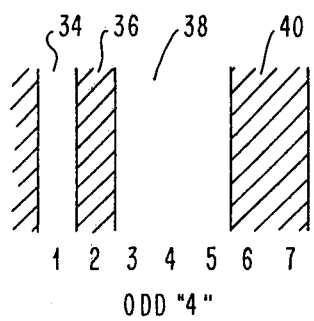
FIGS. 3 and 4 represent the two forms of the decimal character "4" as that character would appear both to the left (odd) and to the right (even) of the center character in a label.

FIG. 3 is a UPC representation of the decimal character "4" as that character would appear in the bank of the characters to the left of the center character 32. Like all data characters, the "4" character is considered to be seven modules long with each bar or space being one or more modules in width. The odd "4" character consists of a single module space 34, a single module bar 36, a three module space 38, and a two module bar 40. This particular character has at least two things in common with all of the characters appearing to the left of the center character 32. First, every character begins with a space and ends with a bar. Second, the combined width of the bars 36 and 40 is an odd number of modules; in this case, three.

Figure 4:
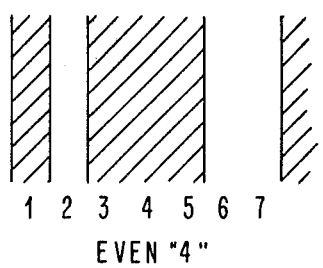

Referring to FIG. 4, when the numeral "4" is to appear to the right of the center character, the coded character is the binary complement or "negative" of the left or odd "4." That is, the encoded representation has a bar in each module occupied by a space in the odd "4" and a space in each module occupied by a bar in the odd "4." Characters appearing to the right of center are referred to as even characters, since the bars occupy an even number of modules; in this case, four.

The following table is an encodation of the decimal values 0–9 as those values would be represented to the left and right of the center character on a UPC label. A "0" represents a white bar or space while a "1" represents a black or dark bar. Double or wider bars and spaces are represented by two or more adjacent identical binary characters. An inspection of the table shows that all left characters exhibit odd parity; that is, the combined width of the bars in each character is equal to either three or five modules. In contrast, all right characters exhibit even parity; i.e., the combined width of the bars in a character is always two or four modules.

TABLE 1

| DECIMAL VALUE | LEFT (ODD) CHARACTERS | RIGHT (EVEN) CHARACTERS |
|---|---|---|
| 0 | 0001101 | 1110010 |
| 1 | 0011001 | 1100110 |
| 2 | 0010011 | 1101100 |
| 3 | 0111101 | 1000010 |
| 4 | 0100011 | 1011100 |
| 5 | 0110001 | 1001110 |
| 6 | 0101111 | 1010000 |
| 7 | 0111011 | 1000100 |
| 8 | 0110111 | 1001000 |
| 9 | 0001011 | 1110100 |

A label of the type shown in FIG. 2 is found or framed and then decoded ½ at a time. That is, the candidate select logic will identify as a possible label any stream of data characters bounded by a center character and a guard character. The actual decoding of any candidate begins at the center character and proceeds one character at a time toward the guard characters. The left and right label halves are combined only after decoding.

Figure 5:
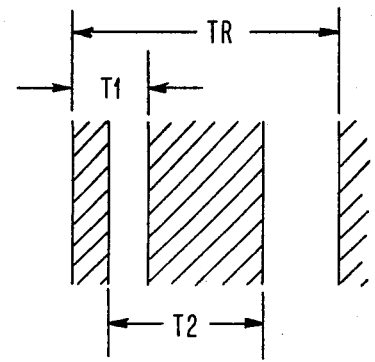
FIG. 5 depicts a UPC character and is labeled to show certain measurements used in the coding of characters.

Within a given label, all data characters have the same physical width. From one label to the next, the absolute width of the data characters may vary over roughly two-to-one range. For that reason, a UPC label is decoded as much as possible using relative width measurements rather than absolute width measurements. Referring to FIG. 5, three of the width measurements used in the decoding process are defined there. Measurement T1 represents the combined width of the first bar-space pair in the character in the direction of decoding. Measurement T2 is equal to the combined width of the first space-bar pair in the direction of decoding. The measurement TR represents the total width of the two bars and two spaces which make up the character. A fourth measurement, not illustrated, which may be needed to decode the "ambiguous" characters 1, 2, 7, 8 is ΣTB which is equal to the combined widths of the two black bars in the particular data character.

The majority of decimal values (0, 3, 4, 5, 6, and 9) can be decoded using the T1, T2 and TR measurements. These measurements are converted within the decoding process into N1 and N2 values in accordance with the following equations.

$$N1 = \frac{7T1}{TR} \quad (1)$$

$$N2 = \frac{7T2}{TR} \quad (2)$$

Since each data character is considered to be seven modules wide, the N1 and N2 values are actually normalized representations of the T1 and T2 measurements, respectively.

TABLE 2

| LEFT (ODD) | N1 | N2 | RIGHT (EVEN) | N1 | N2 |
|---|---|---|---|---|---|
| 0 | 2 | 3 | 0 | 5 | 3 |
| 1 | 3 | 4 | 1 | 4 | 4 |
| 2 | 4 | 3 | 2 | 3 | 3 |
| 3 | 2 | 5 | 3 | 5 | 5 |
| 4 | 5 | 4 | 4 | 2 | 4 |
| 5 | 4 | 5 | 5 | 3 | 5 |
| 6 | 5 | 2 | 6 | 2 | 2 |
| 7 | 3 | 4 | 7 | 4 | 4 |
| 8 | 4 | 3 | 8 | 3 | 3 |
| 9 | 3 | 2 | 9 | 4 | 2 |

The values of N1 and N2 for the odd and even decimal values are shown in Table 2. The various unique combinations of N1 and N2 values which result from the application of equations 1 and 2 are sufficient to fully identify the six non-ambiquous decimal values 0, 3, 4, 5, 6 and 9. The table shows, however, that 1 cannot be distinguished from 7 in either the odd or the even set of characters since both have the same N1 and N2 values. Similarly, 2 cannot be distinguished from 8 on the basis of N1 and N2 values alone. To distinguish a 1 from a 7 or a 2 from an 8, an additional measurement is required. The additional measurement is the bar width measurement ΣTB, representing the combined width of the two bars in the data character. In the decoding process, the ΣTB or NB value is normalized to yield an NB value in accordance with the formula:

$$NB = \frac{7\Sigma TB}{TR}$$

The combined widths of the bars of the two possible characters in a subset (for example, odd 1, odd 7) are always different and can be used to distinguish one of the subset characters from the other. For example, NB for odd 1 is equal to three while NB for odd 7 is equal to five.

The idealized NB values, hereafter referred to as K values, are listed below in Table 3. The K values for the ambiguous 1, 7, 2, 8 decimal characters are needed to fully decode those characters. The K values for the remaining decimal values are not needed to decode those characters but are instead used in the systematic error correction technique to be described later.

TABLE 3

| LEFT (ODD) | K | RIGHT (EVEN) | K |
|---|---|---|---|
| 0 | 3 | 0 | 4 |
| 1 | 3 | 1 | 4 |
| 2 | 3 | 2 | 4 |
| 3 | 5 | 3 | 2 |
| 4 | 3 | 4 | 4 |
| 5 | 3 | 5 | 4 |
| 6 | 5 | 6 | 2 |
| 7 | 5 | 7 | 2 |
| 8 | 5 | 8 | 2 |
| 9 | 3 | 9 | 4 |

Figure 6:
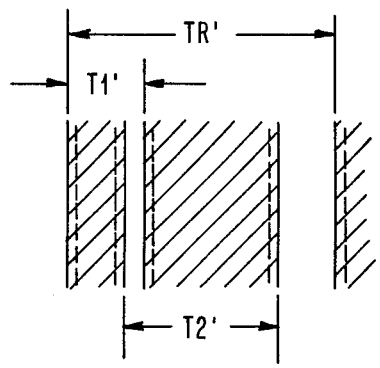
FIG. 6 depicts the same character shown in FIG. 5 but distorted to show the effects of ink spread on the character measurements.

The effect of one type of systematic error, ink spread, on the above-discussed UPC character is shown in FIG. 6. An ink spread condition may be caused by the application of too much ink during the label printing process. Each black bar in the UPC character may become considerably wider than its intended width, which is shown by the dotted lines within each cross hatched or black bar area. The excess ink encroaches into the region which is supposed to be occupied by spaces or white bars causing those spaces to appear narrower than intended.

A systematic error such as ink spread does not affect the accuracy of T1, T2 or TR measurements. Ink spread shifts those measurements slightly in space either to the left or to the right. The shift does not alter the equality between T1' and T1, T2' and T2, or TR' and TR as those terms are defined in FIGS. 5 and 6. For that reason, the values N1 and N2 are not affected by systematic errors of the type described. However, systematic errors clearly affect ΣTB and the related value NB since those values are proportional to the combined absolute widths of the bars in the character. Since the choice between one ambiguous character in the subset and the other ambiguous character depends on the magnitude of the value NB, it is necessary to take the effects of systematic errors into account in computing NB.

Figure 7:
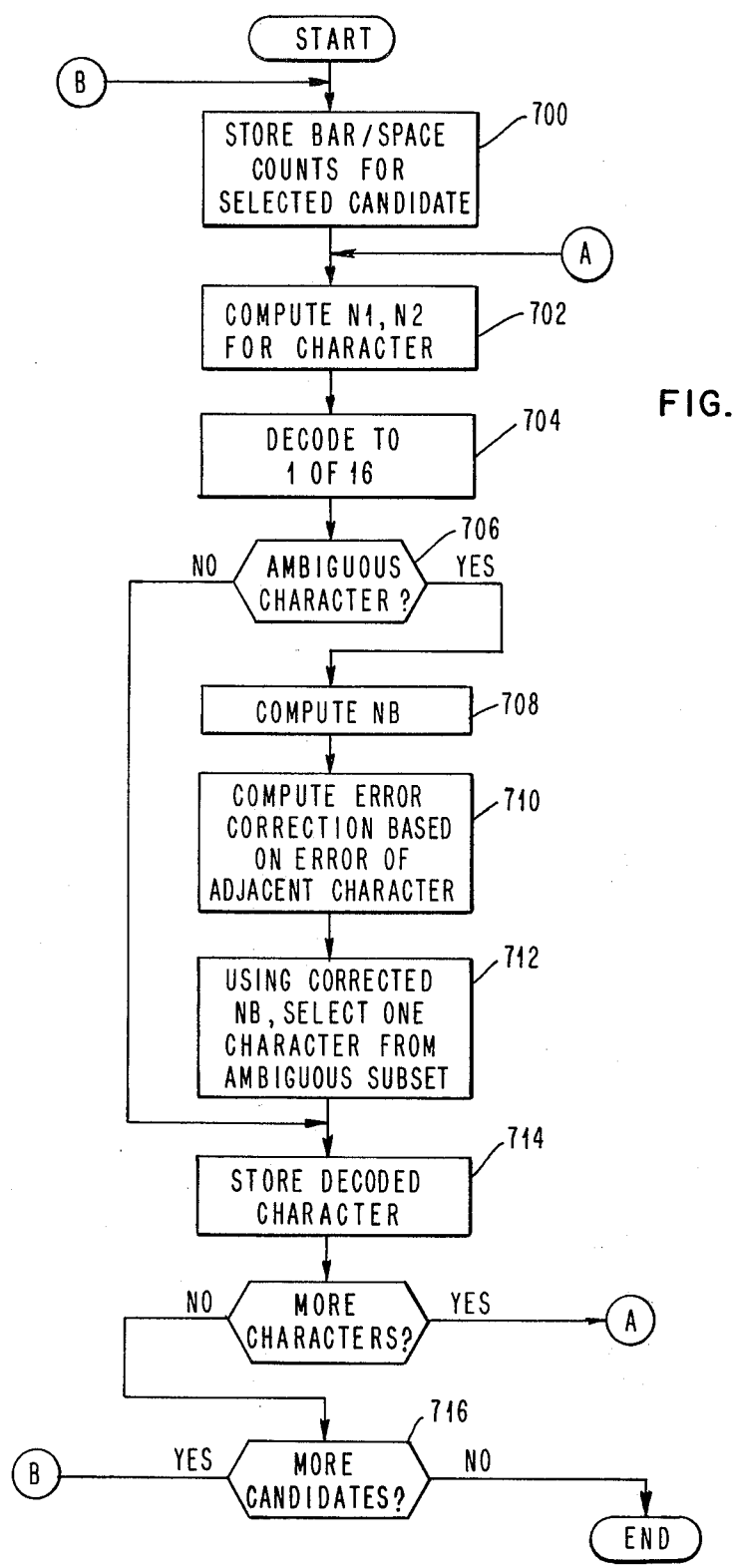
FIG. 7 is a general flow chart of a systematic error correction technique employing the present invention.

FIG. 7 is a general flow chart of a preferred technique for taking trends in systematic errors into account in computing systematic error correction values. The invention is disclosed and discussed in terms of flow charts from this point on, since the best mode of implementing the present invention is by programming of a general purpose processor.

Generally speaking, the initial step (block 700) in the decoding process calls for the storage of bar-space counts for a selected label candidate. Each count stored is directly proportional to the width of the particular bar or space. In this context, a selected candidate would consist of a center character and six data characters to the left or right of center. The bar/space counts are combined to derive the T1, T2 and TR measurements. These measurements are used (block 702) to compute N1 and N2 values for a particular character. By reference to a version of Table 2 stored in a computer memory, the N1 and N2 values can be used (block 704) to decode the character to one of sixteen possible values. From the sixteen possible values identifiable by the N1, N2 values alone, twelve can be uniquely identified by N1 and N2. The remaining four of the sixteen values are actually subsets of "ambiguous" characters. These subsets consist of: odd 1, 7; odd 2, 8; even 1, 7; and even 2, 8. While the N1 and N2 values will identify one of the four subsets, the identification of a particular character within the subset is not possible using N1, N2 values alone. If one of the four subsets or "ambiguous" characters is identified (block 706), NB is computed (block 708) for the character. The value of NB is modified (block 710) by means of an error correction value which is based on the previously detected error in the previously decoded or adjacent character. The corrected NB value is then used (block 712) to finally select one of the two characters in the previously identified subset. The decoded character value is stored (block 714).

If the initial decode indicated a unique character rather than a subset, the program bypasses any computation of NB or error correction, proceeding directly from the initial decode (block 704) to the storing (block 714) of the decoded character.

This sequence of steps is repeated using stored bar-space counts for each character in the label candidate. When the label candidate has been fully decoded, a check is made (block 716) as to whether more label candidates are available for decoding. If they are, the sequence of steps is repeated beginning with the storage of bar-space counts for the newly selected candidate. When all candidates have been fully processed, this process is terminated.

Figure 8A:
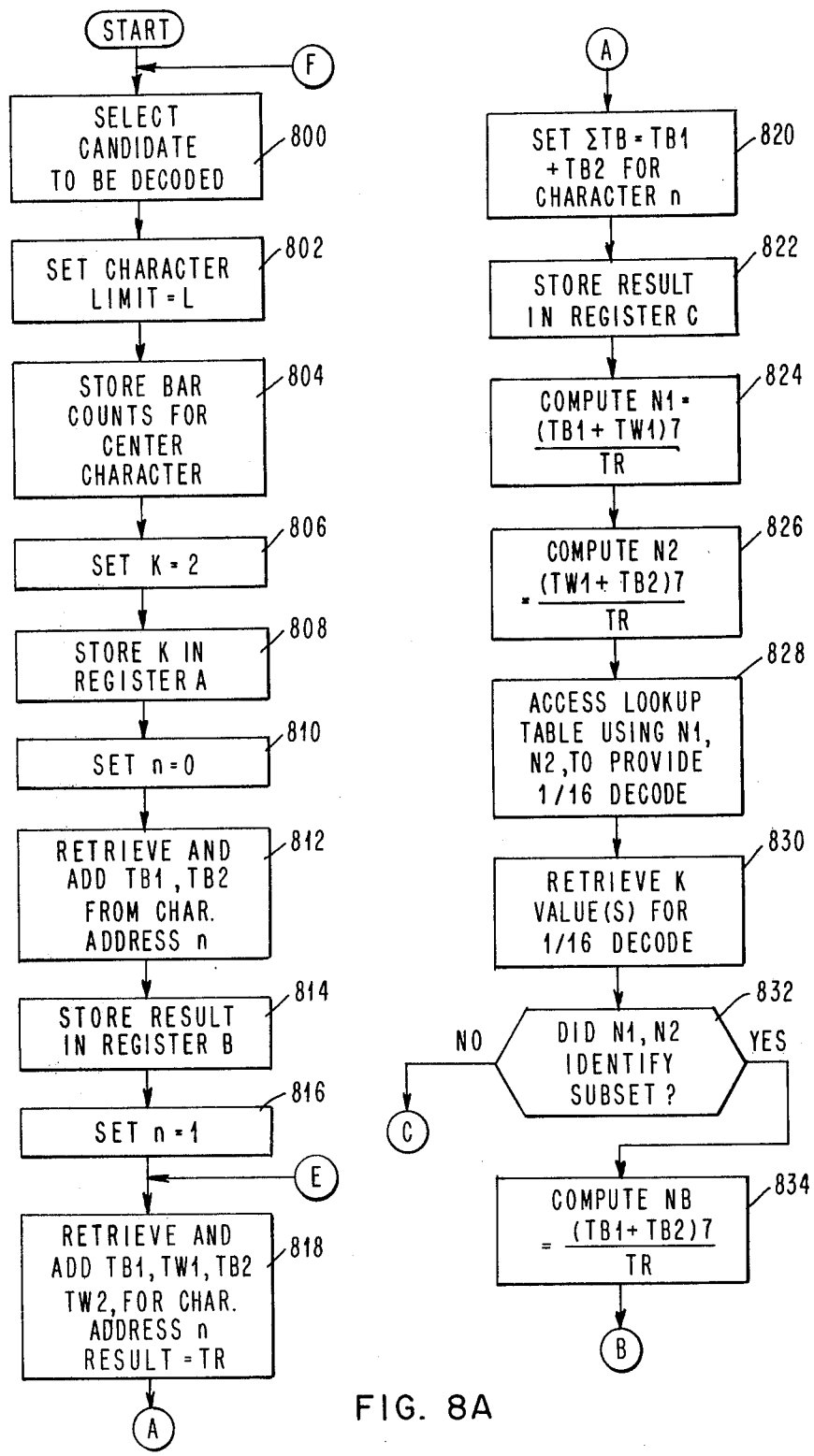
FIGS. 8A and 8B taken together are a more detailed flow chart of the technique represented generally in FIG. 7.
Figure 8B:
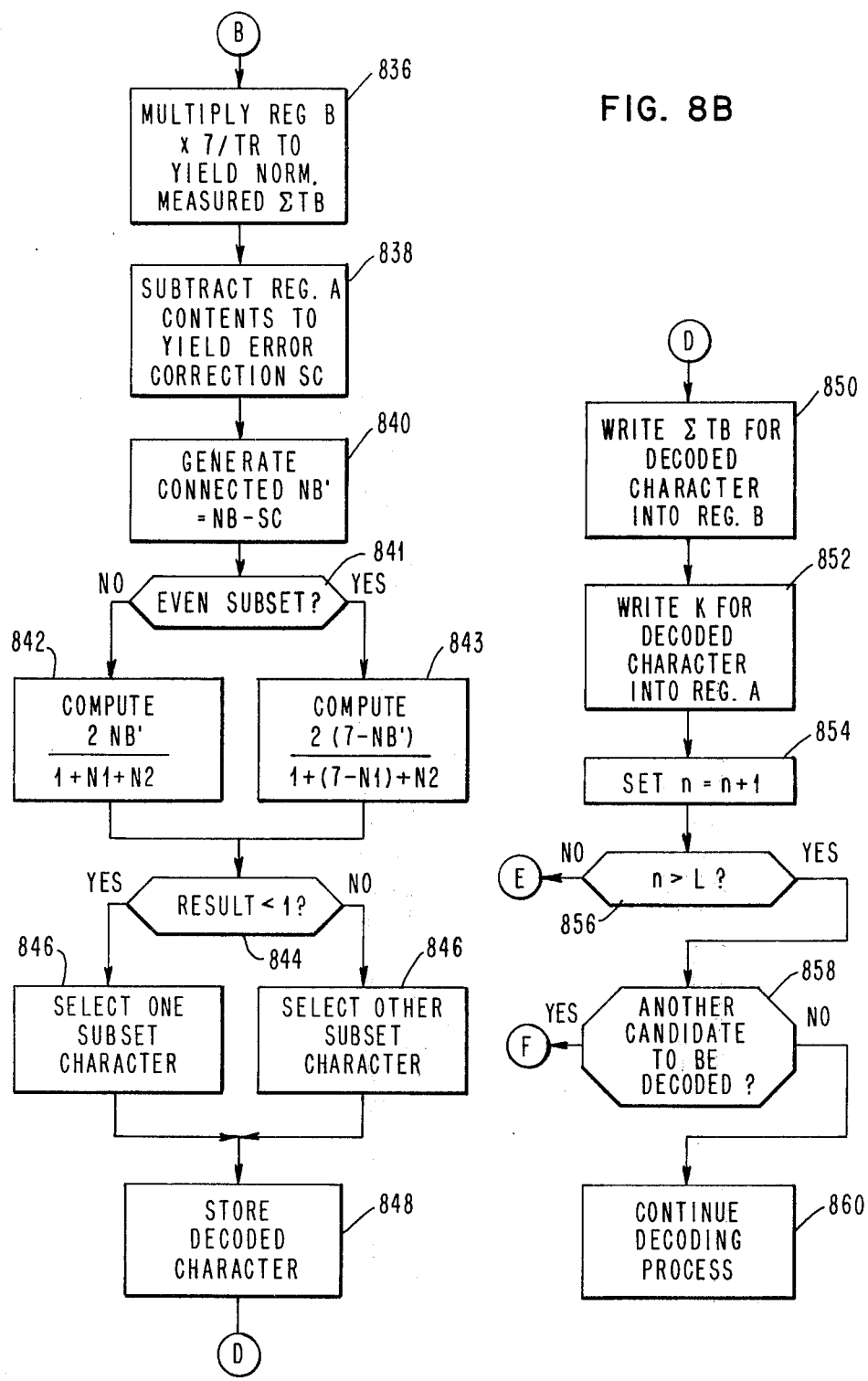

A more comprehensive explanation of the error correction technique is given below with reference to FIGS. 8A and 8B.

Before the program to be described is called, it is assumed that candidate select logic will have identified and framed one or more label candidates. The framing signals locate the center character and, by implication, the six data characters which are assumed to exist for the particular type of label under consideration. Since there may be less than six data characters in certain types of labels, the framing signals also must establish the exact number of data characters in each label candidate.

One of the label candidates is selected (block 800), preferably on a first to occur basis, and the character limit L is established (block 802) equal to the number of data characters in the candidate. The pulse width counts for the two black bars in the center character are read and stored (block 804) in an address arbitrarily designated as a 0 address. A K value, equal to the normalized, standard width of the black bars in the center character, is set to 2 (block 806) with the result being stored (block 808) in a register arbitrarily designated as register A.

Then, an address pointer n is set to 0 (block 810). With the address pointer n=0, the pulse width counts TB1 and TB2 for the black bars in the center character are retrieved and added to produce ΣTB (block 812) for the center character. The result is stored (block 814) in the second register, arbitrarily designated as register B.

The address pointer n is incremented (block 816) to point to the memory location for the first data character in the label candidate; that is, the data character adjacent to the center character. The pulse width counts for the two bars and two spaces in this data character are retrieved and added to produce the value TR (block 818). The quantity ΣTB is computed (block 820) by summing the widths of the two black bars in the data character and the result is stored in an arbitrarily designated register C (block 822). The N1 and N2 values for the character under consideration are computed (blocks 822 and 824) and used to access a lookup table (block 828) to decode the character either to one of twelve uniquely identifiable decimal values or to one of the four subsets of decimal values. When the unique decimal value or subset has been identified, the K value (or values) are retrieved (block 830) from memory using the stored equivalent of Table 3.

The N1 and N2 values are then examined to determine whether a unique character or a subset of characters has been identified (block 832). If the N1 and N2 values fully identify a unique decimal value, a number of program steps are skipped with the program branching directly to a subsequent entry point "C" (blocks 848) at which the decoded character is stored.

If, however, the N1 and N2 values indicate that a subset has been identified, then a choice must be made between the characters in that subset. The first step (block 834) in making that choice is to compute the NB value for the data character under consideration. The next step (block 836) is to multiply the contents of register B, which in this instance represents the ΣTB for the previously considered center character times 7/TR to yield the normalized value of the actual width of the bars in the character having its bar width stored in register B. In the initial pass through the program, the bar widths for the center character are stored in register B. The contents of register A, the K value or standard normalized ΣTB, are subtracted (block 838) from the normalized measured ΣTB for the character to yield an error correction value SC. The error correction value is used to modify the computed NB value (block 840) for the data character actually being decoded. A check must then be made whether the identified subset has odd or even characters (block 841). If an odd character subset is identified, the corrected NB value or NB' is used (block 842) in the formula $$\frac{2NB'}{1 + N1 + N2}.$$

If the identified subset is that of an even pair, then the seven's complement of NB' and N1 (i.e., NB'=7−NB', N1=7−N1) are used (block 843) in the formula. Depending on whether the magnitude of the result is less than one or is equal to or greater than one (block 844), one character or the other in the identified subset is selected (block 846) in accordance with Table 4 below. The fully decoded character is stored (block 848) in a label buffer.

TABLE 4

$$\frac{2NB}{1 + N1 + N2}$$

|  | | <1 | ≧1 |
|---|---|---|---|
| IDENTIFIED SUBSET | ODD 1, 7 | ODD 1 | ODD 7 |
|  | ODD 2, 8 | ODD 2 | ODD 8 |
|  | EVEN 1, 7 | EVEN 1 | EVEN 7 |
|  | EVEN 2, 8 | EVEN 2 | EVEN 8 |

After the storage step, the computed TB value for the fully decoded character is written into register B (block 850), replacing the previous contents of that register. The standard TB or K value for the fully decoded character is also written into register A (block 852), replacing the previous contents of that register. The character address pointer N is incremented (block 854) and a check is made as to whether the address pointer N exceeds the character limit L (block 856). If N is less than or equal to L, the program branches to a re-entry point E (block 818). The characteristics of the next data character in the direction of decoding are computed.

If the next data character is found to be one of the ambiguous characters, the error correction steps outlined above are carried out using the measured and standard characteristics of the previously decoded character. In the second pass through the program, any error correction for the second data character to be considered would be based on the characteristics of the data character decoded during the previous pass.

The described steps are repeated for every data character in the label candidate under consideration. Since the amount of error correction for a given data character will always depend on the actual measurements of the previously decoded character, any trends in systematic error (e.g., ink spread which increases from one end of the label to the other) will be reflected in the amount of error correction actually applied.

When all of the data characters in the label candidate have been fully decoded, a check is made (block 858) as to whether any other candidates remain to be decoded. If there are other candidates, the process is repeated as many times as is necessary. Once all candidates have been fully decoded and the results stored in the appropriate registers, the decoding process can be continued (block 860) by performing data corroboration operations, modulo checks or similar error checking operations.

FIG. 9 is a partial representation of the pulse train which would be produced upon reading a partial UPC label consisting of a center character and data characters "185" in sequence to the right of the center character. Various values which would result from the application of the above-discussed program are shown below for three successive passes through the program. On the first pass, the first data character or even "1" would be decoded in part by use of error correction values based on the measured characteristics of the center character. On the second pass, the even "8" character would be decoded with the error correction values being based on the measured characteristics of the now fully decoded even "1" character. On the third pass, the even "5" character would be decoded. Unlike the previous data character, the even "5" character is uniquely identified by the computed N1 and N2 values. Therefore, it is unnecessary to perform any error correction operations in decoding this character. If the next or fourth data character (not shown) were found to be an ambiguous character, the measured characteristics of the previously decoded even "5" character would be used to calculate the appropriate error correction values.

---

First Pass

Reg. A = 2
Reg. B = 12 + 12 = 24
TR = 70

$$N1 = \frac{7(12 + 8)}{70} = 2$$

$$N2 = \frac{7(8 + 12)}{70} = 2$$

K = 4 (EVEN 1) or 2 (EVEN 7)

$$NB = \frac{7(22 + 22)}{70} = 4.4$$

$$SC = \frac{7(24)}{70} - \text{Reg. A} = 2.4 - 2 = 0.4$$

NB' = 4.4 − 0.4 = 4.0

$$\frac{2(7 - NB')}{1 + (7 - N1) + N2} = \frac{2(3)}{1 + (5) + 2} = \frac{6}{8} \text{ or } < 1$$

---

-continued

First Pass

∴ character is EVEN 1, having K = 4

---

Second Pass

Reg. A = 4
Reg. B = 22 + 22 = 44
TR = 70

$$N1 = \frac{7(14 + 16)}{70} = 3$$

$$N2 = \frac{7(16 + 14)}{70} = 3$$

K = 4 (EVEN 2) or 2 (EVEN 8)

$$NB = \frac{7(14 + 14)}{70} = 2.8$$

$$SC = \frac{7(44)}{70} - 4 = 4.4 - 4 = 0.4$$

NB' = 2.8 − 0.4 = 2.4

$$\frac{2(7 - NB')}{1 + (7 - N1) + N2} = \frac{2(4.6)}{1 + 4 + 3} = \frac{9.2}{8} \text{ or } < 1$$

∴ character is EVEN 8, having K = 2

---

Third Pass

Reg. A = 2
Reg. B = 14 + 14 = 28
TR = 70

$$N1 = \frac{7(14 + 16)}{70} = 3$$

$$N2 = \frac{7(16 + 34)}{70} = 5$$

∴ character is EVEN 5 with K = 4

---

While there has been described what is considered to be the best mode for implementing the invention, it should be understood that the invention may be implemented in different ways which would still fall within the spirit and scope of the invention. Therefore, it is intended that the appended claims shall be construed to include not only the best mode, but all modes falling within the true spirit and scope of the invention.

Having thus described my invention with reference to a preferred embodiment thereof, what I claim and desire to protect by Letters Patent is:

1. For use in a system for reading a bar-coded multicharacter label which may include characters which can be fully decoded only by use of a bar width measurement, an improved method for correcting for systematic errors in apparent bar widths comprising the steps of:
    decoding the label characters in succession until a character is encountered which requires a bar width measurement in order to be fully decoded;
    correcting the apparent bar width of said character as a function of the measured character width and the measured and standard total bar width of the previously decoded character;
    fully decoding said character using the corrected bar width; and repeating the above-described steps until all characters in the label have been fully decoded.

2. For use in a system for reading a bar-coded multicharacter label which may include certain characters which can be unambiguously decoded using one or more bar-space pair measurements and other characters which can be partially decoded using bar-space pair measurements and fully decoded only by use of an additional bar width measurement, an improved method for compensating for systematic errors affecting the apparent width of encoded bars comprising the steps of:

decoding label characters in succession using bar-space pair measurements until those measurements indicate a character cannot be fully decoded without the use of a bar width measurement;

generating a spread correction value as a function of the measured width of the character being decoded, the measured widths of the bars in the previously decoded character and the standard total width of the bars in the previously decoded character;

modifying the measured bar widths for the character being decoded in accordance with the generated spread correction value;

completing the decoding of the partially decoded character using the modified bar width value; and repeating the above-described steps until all characters in the label have been fully decoded.

3. An improved method as recited in claim 2 wherein the spread correction value for a character being decoded is $$\frac{(\Sigma TB_{n-1})\, 7}{TR_n} - K_{n-1}$$

where $\Sigma TB_{n-1}$ is the measured total bar width of the previously decoded character, $TR_n$ is the measured width of the character being decoded, and $K_{n-1}$ is the standard total bar width of the previously decoded character.

4. For use in a system for reading a UPC-type label where first and second bar-space pair measurements T1 and T2 are used to unambiguously select decimal characters 0, 3, 4, 5, 6, 9 and to select a first subset consisting of decimal characters 1, 7 or a second subset consisting of decimal characters 2, 8 while a bar width measurement $\Sigma TB$ is needed to finally select one of the characters in a subset, an improved method for correcting $\Sigma TB$ measurements prior to the final selection step to correct for systematic errors comprising the steps of:

decoding the label characters in sequence using T1, T2 measurements until those measurements identify either the first subset or the second subset;

generating a spread correction value as a function of the measured width of the subset character, the measured $\Sigma TB$ for the previously decoded character and the standard $\Sigma TB$ for the previously decoded character;

modifying the measured $\Sigma TB$ for the subset character in accordance with the generated spread correction values;

finally selecting one of the characters in the identified subset as a function of the modified $\Sigma TB$ value; and repeating the above-described steps until all characters in the label have been fully decoded.

5. An improved method as recited in claim 4 wherein the spread correction value for a character being decoded is $$\frac{(\Sigma TB_{n-1})\, 7}{TR_n} - K_{n-1}$$

where $\Sigma TB_{n-1}$ is the measured bar width of the previously decoded character, $TR_n$ is the measured width of the character being decoded, and $K_{n-1}$ is the standard total width of the bars in the previously decoded character.

6. An improved method as recited in claim 5 wherein the final selection of a character from an identified subset is a function of the magnitude of one of the formulas $$\frac{2NB'}{1 + N1 + N2} \text{ or } \frac{2(7 - NB')}{1 + (7 - N1) + N2}$$

where

NB' is proportional to the corrected bar width,

N1 is proportional to the width of the first bar-space pair in the direction of decoding, and N2 is proportional to the width of the first space-bar pair in the direction of decoding.

7. An improved method as recited in claim 6 wherein a 1 or a 2 is selected from an identified subset where the magnitude of the formula is less than one while a 7 or an 8 is selected where the magnitude of the formula is equal to or greater than one.

* * * * *